United States Patent

Sagucio

[11] Patent Number: 5,125,364
[45] Date of Patent: Jun. 30, 1992

[54] PET FEEDING DEVICE WITH ANT-CONFUSING LEGS

[76] Inventor: Esteban N. Sagucio, 209-B 14th St., Honolulu, Hi. 96818

[21] Appl. No.: 740,301
[22] Filed: Aug. 5, 1991
[51] Int. Cl.$^5$ ............................................. A01K 5/01
[52] U.S. Cl. .................................................... 119/61
[58] Field of Search .................... 119/72, 61, 51.01

[56] References Cited

U.S. PATENT DOCUMENTS

| | | | |
|---|---|---|---|
| 2,061,957 | 11/1936 | Brown | 119/61 |
| 2,584,301 | 2/1952 | Sinclair | 119/61 |
| 2,793,616 | 5/1957 | Warner | 119/61 |
| 2,973,932 | 3/1961 | van Huis et al. | 119/61 |
| 3,995,595 | 12/1976 | Williams | 119/61 |
| 4,257,353 | 3/1981 | Imhoff | 119/61 |
| 4,953,506 | 9/1990 | Sanders | 119/61 |

Primary Examiner—John G. Weiss

[57] ABSTRACT

A feeding device for pet dog and cat elevated with plurality of legs, each leg having a pair of risers with a coil disposed intermediate a common base-end and top end of each riser, is disclosed. The coil portion is designed to confuse ants of the route between the ground and receptacle containing the feed, thereby making it difficult to gain access to the feed.

2 Claims, 3 Drawing Sheets

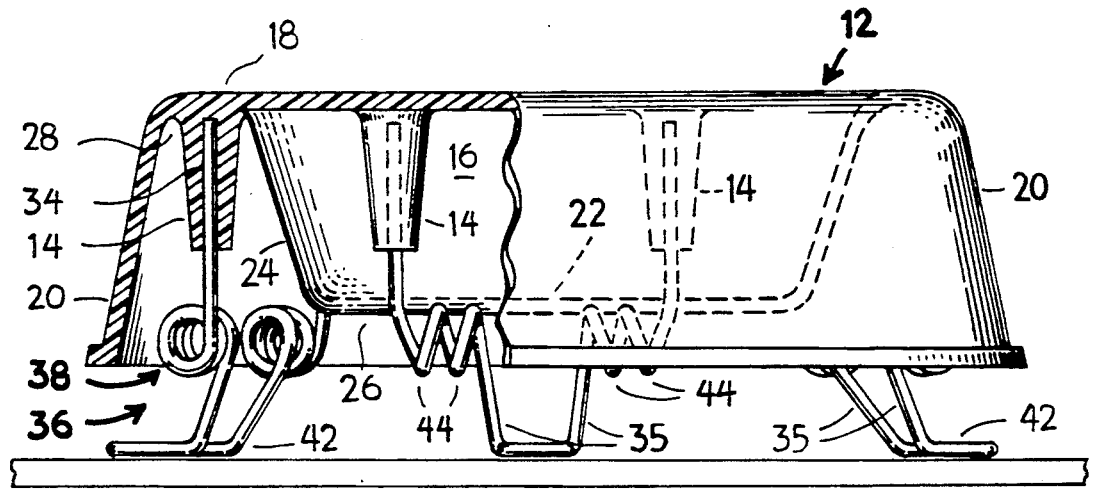
FIG. 1
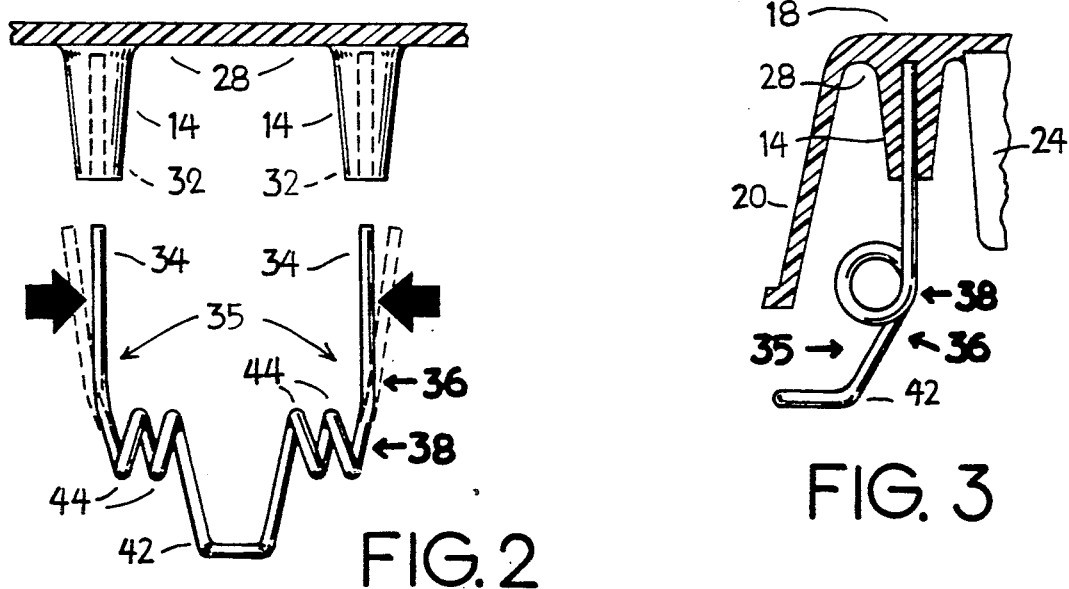
FIG. 2
FIG. 3

1

PET FEEDING DEVICE WITH ANT-CONFUSING LEGS

FIELD OF THE INVENTION

The present invention relates generally to animal feeding device and has to do particularly with an accessory which may be applied to that commonly use by pet dog and cat.

THE PRIOR ART

Commonly used feeding devices lack protection against ant attacks on the food placed in it. The direct route between the ground and the feed receptacle is so short and simple that within a short time it could be invaded by a swarm of ants. Therefore, various designs have been made in an effort to block access to the feed by employing liquid and sticky moats as well as insecticidal elements. Heretofore, prior designs proved unsuccessful due to the emitted smell which is unpleasant to both humans and animals, and the added efforts involved when washing or cleaning the feeding device.

SUMMARY OF THE INVENTION

Accordingly, I have provided an accessory which is economical and simple in construction. It has for its object to make it hard for ants to get to the feed in the receptacle. It includes generally upright legs having horizontally oriented coils which produce a confusing pattern of repeated up-and-down route. With this invention, immunity from ant invasion is almost assured.

In a preferred embodiment of the invention, there is provided a plurality of upright legs about the underside periphery for elevating a pet feeding device a convenient height above the ground. The upper end of each leg riser is received and gripped by a corresponding integral stud projecting downwardly from the underside of the rim of the device. A coil is disposed intermediate a common base-end and the upper end of each riser, which provide a confusing route between the ground and the feed in the feeding receptacle.

According to another preferred embodiment, the invention provides an assembled support means adaptable for use with the common and already existing feeding device, being supported with legs similar to that used with the first mentioned embodiment. It includes a closed-loop ring-frame having sets of mounting studs projecting downwardly from its underside, each with an opening for receiving and gripping the upper end of a leg riser. The concaved recess at the underside of the rim of the device is adapted to ride over the ring-frame when the feeding device is placed over for support.

BRIEF DESCRIPTION OF THE DRAWINGS

FIG. 1 is an elevational view of a pet feeding device with portion on the left front being removed to show clearly the integral mounting studs underneath the rim.

FIG. 2 is a front view of one of the legs used for elevating the feeding device and corresponding studs for receiving the top ends of the risers of the leg.

FIG. 3 is a right side of the leg shown in FIG. 2, showing a riser being received by a corresponding stud.

DESCRIPTION OF THE PREFERRED EMBODIMENT

Figure 4:
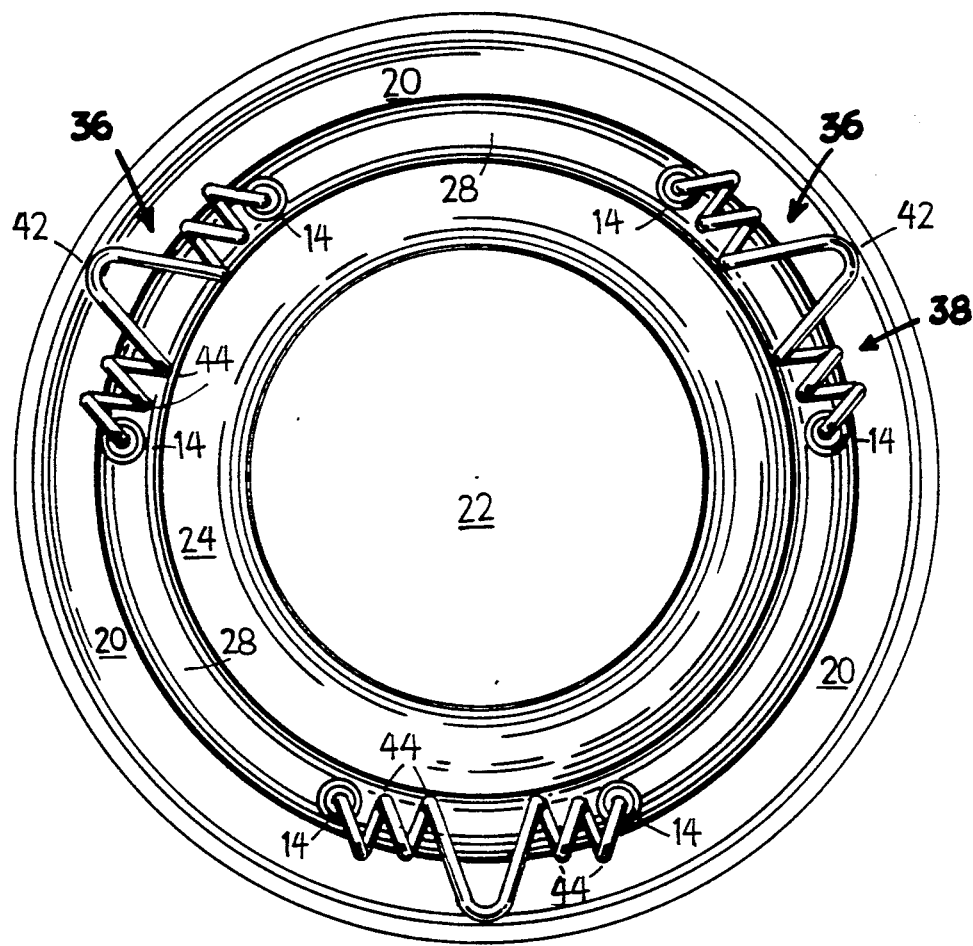
FIG. 4 shows a feeding device in an upside down position with support legs attached.

Referring now to the drawings for a better understanding, an accessory constructed in accordance with the teachings of the present invention is illustrated.

Attention is first directed to FIG. 1 which shows a circular plastic pet feeding device 12, having basically the same familiar parts and structure as that of the commonly used but with studs added. This includes a receptacle portion 16 for receiving the pet food, a base-well portion 20 for stability and strength, and a rim 18 that interconnects the receptacle and the base-wall portions together. The receptacle portion 16 is defined by a bottom wall 22 and a frusto-conical side wall 24 extending in an upwardly diverging direction from the periphery of the bottom wall 22 and terminating unto an inner edge of a somewhat rounded annular rim 18. Another frusto-conical wall is a base-wall 20 that extends from the outer edge of the rim 18 in a downwardly diverging direction. The bottom edge of the base-wall 20 terminates with length equal to or beyond the horizontal level of the lowest point 26 of the receptacle portion 16.

Disposed around the underside 28 of the rim 18 are integral studs 30 suitably spaced and projecting downwardly therefrom. The studs are normally in pairs or sets (see FIG. 2) and each having an opening 32 as shown, for receiving and gripping the upper end 34 of riser 35.

FIG. 2 shows one of the three legs 36 for elevating the feeding device a convenient height above the ground. It is formed from a single elongate wire of at lest about 3-millimeters in diameter with each riser 35 having a coil 38 as shown, each coil being located intermediate a respective top end 34 and a common base-end 42. One of the pair of coils 38 on each leg 36 is made a mirror-image of the other. The coils are horizontally oriented and thus it provide a confusing pattern of repeated up-and-down route for ants to negotiate through. The coils are of sufficient distance from the ground and parts associated with the feeding device (see FIG. 3), and also the individual loops 44 are spaced apart from each other such that ants can not make a short-cut passage across.

For easy assembly of the new invention by the end-user, opening 32 does not have to be made so tight for the top end 34 to be slided into. One remedy to keep the leg from coming off the opening is to spread the top ends 34 apart as shown by broken lines in FIG. 2 (if not done so in the factory), and then press toward each other while inserting same into said openings. The resilient force tending to urge the top ends 34 back to the original relaxed position should provide sufficient holding friction against a portion of the inner face of the opening 32.

Figure 5:
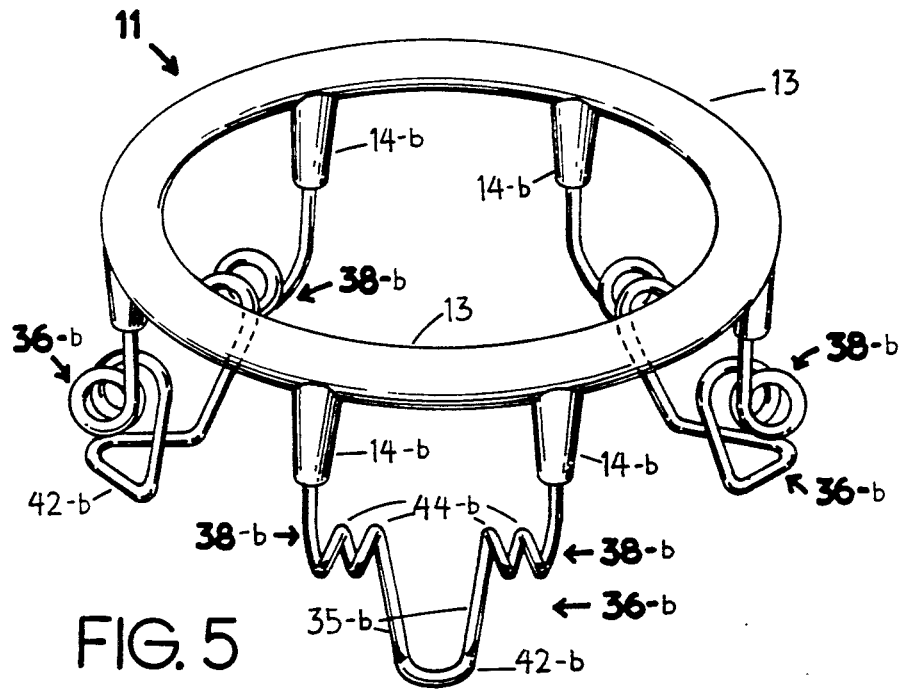
FIG. 5 shows a ring-frame with legs attached, employable for elevating a common and already existing feeding device.

Attention is now directed to FIG. 5 which shows an assembled support means 11 for elevating a common and already existing feeding device 12-b (see FIG. 6) or one without built-in studs. It includes a closed-loop plastic ring-frame 13 having suitably distributed at its underside at least three pairs or sets of integral studs 14-b for receiving and gripping a number of corresponding pairs of risers 35-b.

Figure 6:
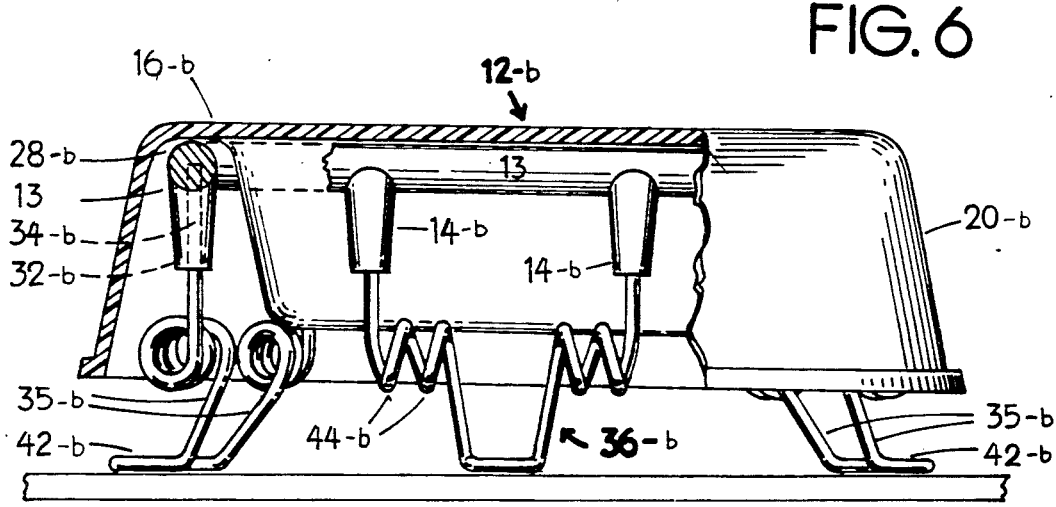
FIG. 6 shows a common feeding device with portion removed, being supported by an assembled ring-framed support means.

The legs 36-b used in the assembled support means 11, shown in FIG. 5, have the same features and method of attachment to the studs 14-b as that described earlier and used on a feeding device shown in FIG. 1, and therefore further discussion is not necessary, although parts similar to those used in FIGS. 1 and 2 get the same numerical designation with a suffix "b" added. In use, the common feeding device, without built-in studs, is simply placed over the assembled support means 11 with the ring-frame 13 supporting the former at the concaved recess underside 28-b of rim 16-b, as shown in FIG. 6.

It will be appreciated that the ring-frame 13 can also be made of metal of the same type as that used for the legs 36-b and that welding job across the metal ring-frame and the upper ends of the legs (not shown) is most appropriate. It will likewise be appreciated that some pet feeding devices are square-shaped while others are rectangular particularly those with double receptacles. Therefore, it is important that the ring-frame be shaped to conform peripherally with the configuration of the concave recess underneath the rim 16-b and that an appropriate number of legs will also have to be considered.

While I have described my invention by means of preferred embodiments, it will be understood that numerous changes and modifications may be made by those skilled in the art without departing from the spirit and scope of the invention as defined in the appended claims:

I claim:

1. An elevated feeding device for animals comprising:
   a feeding receptacle having a bottom wall and a side wall extending upwardly and outwardly from said bottom wall,
   a curved rim portion having an edge attached to an upper edge of said side wall, said rim portion having an other edge attached to a base-wall portion, for stability and strength, that extends downwardly from said rim portion to a position below the bottom wall,
   a plurality of stud members integrally attached to the rim portion and positioned between said side wall and said base-wall portion, said stud members having an aperture there through,
   a plurality of upright legs to elevate the feeding device having a base portion and a pair of top ends extending into said aperture of the stud member, said legs also have a pair of coiled portions between the base portion and each top end to confuse and discourage an insect that is climbing the upright leg.

2. An elevated feeding device for animals comprising:
   a feeding receptacle having a bottom wall and a side wall extending upwardly and outwardly from said bottom wall,
   a curved rim portion having one edge attached to an upper edge of said side wall, said rim portion having an other edge attached to a base-wall portion, for stability and strength, that extends downwardly from said rim portion to a position below the bottom wall,
   a closed loop ring positioned below the rim portion and between said side wall and said base-wall,
   a plurality of stud members integrally attached to the closed loop to extend downwardly between said side wall and said base-wall portion, said stud members having an aperture there through,
   a plurality of upright legs to elevate the feeding device having a base portion and a pair of top ends extending into said aperture of the stud members, said legs also have a pair of coiled portions between the base portion and each top end to confuse and discourage an insect that is climbing the upright leg.

* * * * *